(12) United States Patent
Frenne et al.

(10) Patent No.: US 12,341,641 B2
(45) Date of Patent: *Jun. 24, 2025

(54) METHOD FOR PEAK TO AVERAGE POWER REDUCTION OF DM-RS SIGNALS

(71) Applicant: Telefonaktiebolaget LM Ericsson (publ), Stockholm (SE)

(72) Inventors: Mattias Frenne, Uppsala (SE); Lars Lindbom, Karlstad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,895

(22) Filed: Jan. 15, 2024

(65) Prior Publication Data
US 2024/0163150 A1    May 16, 2024

Related U.S. Application Data

(63) Continuation of application No. 17/283,732, filed as application No. PCT/SE2019/050951 on Oct. 2, 2019, now Pat. No. 11,876,657.
(Continued)

(51) Int. Cl.
*H04L 27/26*  (2006.01)
*H04L 5/00*   (2006.01)
(Continued)

(52) U.S. Cl.
CPC ...... *H04L 27/2613* (2013.01); *H04L 27/2615* (2013.01); *H04W 72/0466* (2013.01); *H04W 72/23* (2023.01); *H04L 5/0051* (2013.01)

(58) Field of Classification Search
CPC ............. H04L 27/2613; H04L 27/2615; H04L 5/0051; H04L 5/0016; H04L 5/0023; H04W 72/0466; H04W 72/23

See application file for complete search history.

(56) References Cited

U.S. PATENT DOCUMENTS

2018/0278395 A1* 9/2018 Yoon ................. H04L 5/0051

FOREIGN PATENT DOCUMENTS

CN   105790819 A  *  7/2016
EP      3852462 A1     7/2021
(Continued)

OTHER PUBLICATIONS

3rd Generation Partnership Project, "3rd Generation Partnership Project; Technical Specification Group Radio Access Network; NR; Physical Channels and Modulation (Release 15)", Technical Specification, 3GPP TS 38.211 V15.3.0, Sep. 2018, pp. 1-96, 3GPP.
(Continued)

*Primary Examiner* — Jianye Wu
(74) *Attorney, Agent, or Firm* — COATS & BENNETT, PLLC

(57) ABSTRACT

A user equipment (UE) is configured to enhance Demodulation Reference Signals (DM-RS) in order to reduce the Peak-to-Average Power Ratio (PAPR) to the same level as for data symbols. To accomplish this function, the UE obtains a first initialization value that is calculated based on one of a first parameter (e.g., cell ID) and a second parameter and a scrambling code ID. The UE then maps the first initialization value to either a first Code Division Multiplexing (CDM) group or a second CDM group based on the scrambling code ID. The mapping associates the first initialization value with the first or second CDM group such that the initialization value is used when generating a demodulation sequence for that CDM group.

16 Claims, 17 Drawing Sheets

Related U.S. Application Data

(60) Provisional application No. 62/744,095, filed on Oct. 10, 2018.

(51) Int. Cl.
*H04W 72/044* (2023.01)
*H04W 72/23* (2023.01)

(56) References Cited

FOREIGN PATENT DOCUMENTS

| | | |
|---|---|---|
| JP | 2022500925 A | 1/2022 |
| WO | 2020052419 A1 | 3/2020 |

OTHER PUBLICATIONS

Vivo, "Discussion on Low PAPR RS", 3GPP TSG RAN WG1 Meeting #94bis, Chengdu, China, Oct. 8-12, 2018, pp. 1-4, R1-1810405, 3GPP.
Intel Corporation, "Low PAPR Reference Signals", 3GPP TSG RAN WG1 Meeting #94bis, Chengdu, China, Oct. 8-12, 2018, pp. 1-10, R1-1810793, 3GPP.
Ericsson, "On Specification-Based Solutions to the DMRS PAPR Issue", 3GPP TSG RAN WG1 Meeting #94-bis, Chengdu, China, Oct. 8-12, 2018, pp. 1-5, R1-1811542, 3GPP.

* cited by examiner

FIG. 3

METHOD FOR PEAK TO AVERAGE POWER REDUCTION OF DM-RS SIGNALS

RELATED APPLICATIONS

This application is a continuation of prior application Ser. No. 17/283,732 filed 8 Apr. 2021, which is the National Stage of International Application PCT/SE2019/050951 filed 2 Oct. 2019, which claims the benefit of U.S. Provisional Application No. 62/744,095, filed 10 Oct. 2018, each of which is incorporated herein by reference in their entirety.

TECHNICAL FIELD

The present disclosure relates generally to the field of radio communications, and more particularly to reducing Power-to-Average Peak Ratio (PAPR) in order to achieve a high operational efficiency of a Power Amplifier (PA).

BACKGROUND

Signal waveforms with low Peak-to-Average Power Ratio (PAPR) and low Cubic Metric (CM) are desirable when designing wireless systems for achieving high operational efficiency of Power Amplifiers (PA). A signal waveform, i.e. a time continuous signal, with high PAPR/CM has large amplitude variations at the input to the power amplifier and may cause severe clipping of the signal when the PA operates near its maximum output transmit power. This is because a PA has a non-linear relation between the input signal and the output signal, and because the output signal is limited in a maximal possible output amplitude. For low input signal levels, a PA is nearly linear in its characteristics. For high input amplitudes, however, the output signal is limited in amplitude. This is known as clipping, which causes in-band signal distortion as well as out-of-band spurious emissions that degrade the system performance.

SUMMARY

Embodiments of the present disclosure also provide a non-transitory computer-readable storage medium comprising a computer program stored thereon. The computer program comprises executable instructions that, when executed by a processing circuit in a user equipment in a wireless communication network, causes the user equipment to obtain a first initialization value that is calculated based on one of a first and a second parameter and a scrambling code ID, and to map the first initialization value to either a first Code Division Multiplexing (CDM) group or a second CDM group based on the scrambling code ID.

Embodiments of the present disclosure enhance Demodulation Reference Signals (DM-RS) in order to reduce the Peak-to-Average Power Ratio (PAPR) to the same level as for data symbols. Particularly, the initialization values that are used to generate the sequences for data demodulation for the physical uplink and downlink shared channels (i.e., PUSCH and PDSCH, respectively) are different for each of a plurality of Code Division Multiplexing (CDM) groups at a user equipment (UE), and depend on a parameter that is signaled to the UE in the scheduling Downlink Control Information (DCI) message. For example, in one embodiment, the initialization values that get mapped to the CDM groups are mapped differently to the CDM groups being used depending on the value of the signaled parameter received in the scheduling DCI message. Thus, with the embodiments of the present disclosure, the mapping may associate an initialization value with a CDM group such that the associated initialization value is used when generating a demodulation sequence for the CDM group.

Accordingly, embodiments of the present disclosure provide a method implemented by a user equipment (UE). In particular, the method comprises obtaining a first initialization value that is calculated based on one of a first and a second parameter and a scrambling code ID, and mapping the first initialization value to either a first Code Division Multiplexing (CDM) group or a second CDM group based on the scrambling code ID.

Embodiments of the present disclosure also provide user equipment (UE) in a wireless communication network. The UE in these embodiments comprises a communications interface circuit and a processing circuit. The communications interface circuit is configured to communicate with a serving cell in the wireless communication network. The processing circuit is configured to obtain a first initialization value that is calculated based on one of a first and a second parameter and a scrambling code ID, and to map the first initialization value to either a first Code Division Multiplexing (CDM) group or a second CDM group based on the scrambling code ID.

Embodiments of the present disclosure also provide a UE in a wireless communication network. In these embodiments, the UE is configured to obtain a first initialization value that is calculated based on one of a first and a second parameter and a scrambling code ID, and to map the first initialization value to either a first Code Division Multiplexing (CDM) group or a second CDM group based on the scrambling code ID.

Embodiments of the present disclosure also provide a communication system comprising a network node and a user equipment (UE) operable to communicate with the network node. In this embodiment, the UE comprises processing circuitry configured to obtain a first initialization value that is calculated based on one of a first and a second parameter, and a scrambling code ID, and to map the first initialization value to either a first Code Division Multiplexing (CDM) group or a second CDM group based on the scrambling code ID.

BRIEF DESCRIPTION OF THE DRAWINGS

FIG. 3 illustrates mapping of four DM-RS ports on subcarriers within a resource block according to an embodiment.

DETAILED DESCRIPTION

Figure 1:
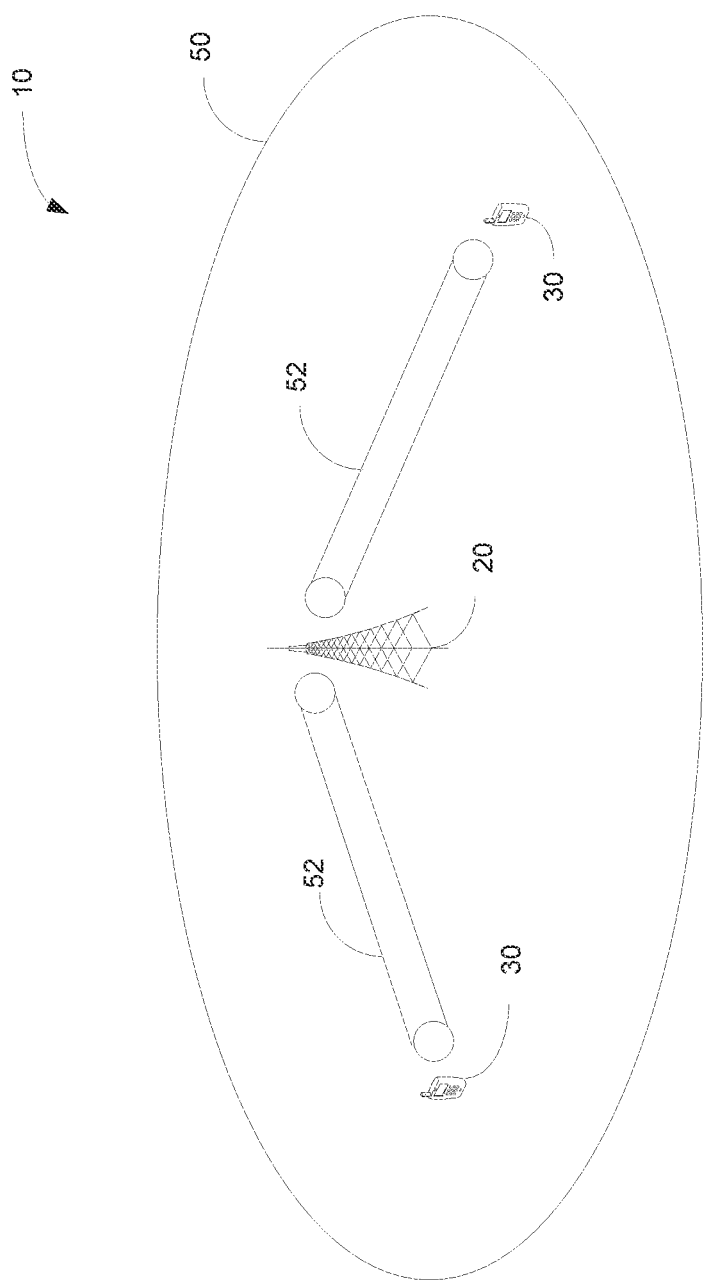
FIG. 1 illustrates an exemplary communication network according to an embodiment.

Referring now to the drawings, an exemplary embodiment of the disclosure will be described in the context of a 5G or New Radio (NR) wireless communication network. Those skilled in the art will appreciate that the methods and apparatus herein described are not limited to use in 5G or NR networks, but may also be used in wireless communication networks where multiple beams within a single cell are used for communication with wireless devices in the cell.

FIG. 1 illustrates a wireless communication network 10 according to the NR standard currently being developed by Third Generation Partnership Project (3GPP). The wireless communication network 10 comprises one or more base stations 20 providing service to user equipments (UEs) 30 in respective cells 50 of the wireless communication network 10. The base stations 20 are also referred to as Evolved NodesBs (eNBs) and gNodeBs (gNBs) in 3GPP standards. Although only one cell 50 and one base station 20 are shown in FIG. 1, those skilled in the art will appreciate that a typical wireless communication network 10 comprises many cells 50 served by many base stations 20.

Further, one feature of NR networks is the ability of the base stations 20 to transmit and/or receive on multiple beams in the same cell 50. FIG. 1 illustrates two beams 52, although the number of beams 52 in a cell 50 may be different.

The UEs 30 may comprise any type of equipment capable of communicating with the base station 20 over a wireless communication channel. For example, the UEs 30 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

As previously stated, a PA has a non-linear relation between the input signal and the output signal. Further, the output signal is limited in a maximum possible output amplitude. For low input signal levels, a PA is nearly linear in its characteristics. However, for high input amplitudes, the output signal is limited in amplitude. This is known as "clipping."

Clipping causes in-band signal distortion as well as out-of-band spurious emissions that degrade the system performance. There are some approaches to avoid impairments due to clipping. One approach, for example, is to increase the linearity requirements on the PA. However, requiring higher linearity of the PA (e.g. by design or by employing linearization techniques) can increase cost significantly. Another approach is to decrease the transmit power such that the probability for clipping is low. This latter approach, however, reduces the coverage of the transmitted signal. Therefore, it is desirable to keep the PAPR/CM of the input signal as low as possible.

The main signal waveform in NR in uplink and downlink refers to a multi-carrier Orthogonal Frequency Division Multiplexing (OFDM) signal generation (a.k.a. CP-OFDM) in which physical layer channels and reference signals are directly mapped on a time-frequency grid. The CP-OFDM scheme offers large flexibility in resource utilization to the cost of a chosen waveform with relatively high PAPR/CM. However, this is a drawback for uplink coverage where transmissions can be power limited. To enhance uplink coverage, transform pre-coded OFDM signal generation (a.k.a. DFT-spread OFDM) was adopted as a complementary uplink waveform for which the CM is in the order of 3 dB lower than it is for CP-OFDM.

It is essential that PAPR and CM of these OFDM waveforms are not increasing by the design of the reference signals. For the CP-OFDM waveform, the reference signal will be QPSK modulated as:

$$r(m) = \frac{1}{\sqrt{2}}(1 - 2 \cdot c(2m)) + j\frac{1}{\sqrt{2}}(1 - 2 \cdot c(2m+1)), m = 0, 1, \ldots$$

where c(i) refers to a length-31 Gold sequence. The Quadrature Phase Shift Keying (QPSK) modulated reference signal will match the PAPR/CM of the CP-OFDM waveform. However, it will not be suitable for the DFT-spread OFDM waveform for which a reference signal is instead derived from a Zadoff-Chu sequence with a PAPR/CM that matches the DFT-spread OFDM waveform.

Like LTE, NR will require DM-RS for coherent demodulation of the physical layer data channels PDSCH (DL) and PUSCH (UL), as well as for PDCCH (DL). The DM-RS is confined to the resource blocks carrying the associated PDSCH/PUSCH, and is mapped on the OFDM time-frequency grid such that the receiver is able to efficiently handle time/frequency-selective fading radio channels.

NR will use a flexible air interface in which the mapping of the DM-RS on the resource elements of an OFDM time-frequency grid is highly configurable. For example, the DM-RS can be configured with respect to:

A mapping type in the frequency domain within one OFDM symbol. This is known as type 1 or type 2 mapping. For type 1 mapping, the maximum number of orthogonal DM-RS ports in one slot is either 4 or 8, whereas for type 2 mapping, the maximum number of orthogonal DM-RS ports in one slot is either 6 or 12, depending on whether one or two adjacent OFDM symbols are used for DM-RS;

The start position in time within the slot for the DM-RS (type A or type B mapping);

The number of additional DM-RS symbols within the transmission interval and the maximum number of supported orthogonal DM-RS ports.

The number of considered DM-RS ports coincides with the number of multiple-input and multiple-output (MIMO) layers that are spatially multiplexed from the transmitter perspective—i.e. one DM-RS port per transmitted layer. Thus, a single-layer (i.e., rank 1) transmission will use a single DM-RS port, whereas a two-layer (i.e., rank 2) transmission will use two DM-RS ports. Typically, the DM-RS ports used in SU-MIMO transmissions represent a subset of the total available DM-RS ports given by the DM-RS configuration. Further, the ports used in the transmission are indicated via the physical downlink control channel (PDCCH).

Figure 2:
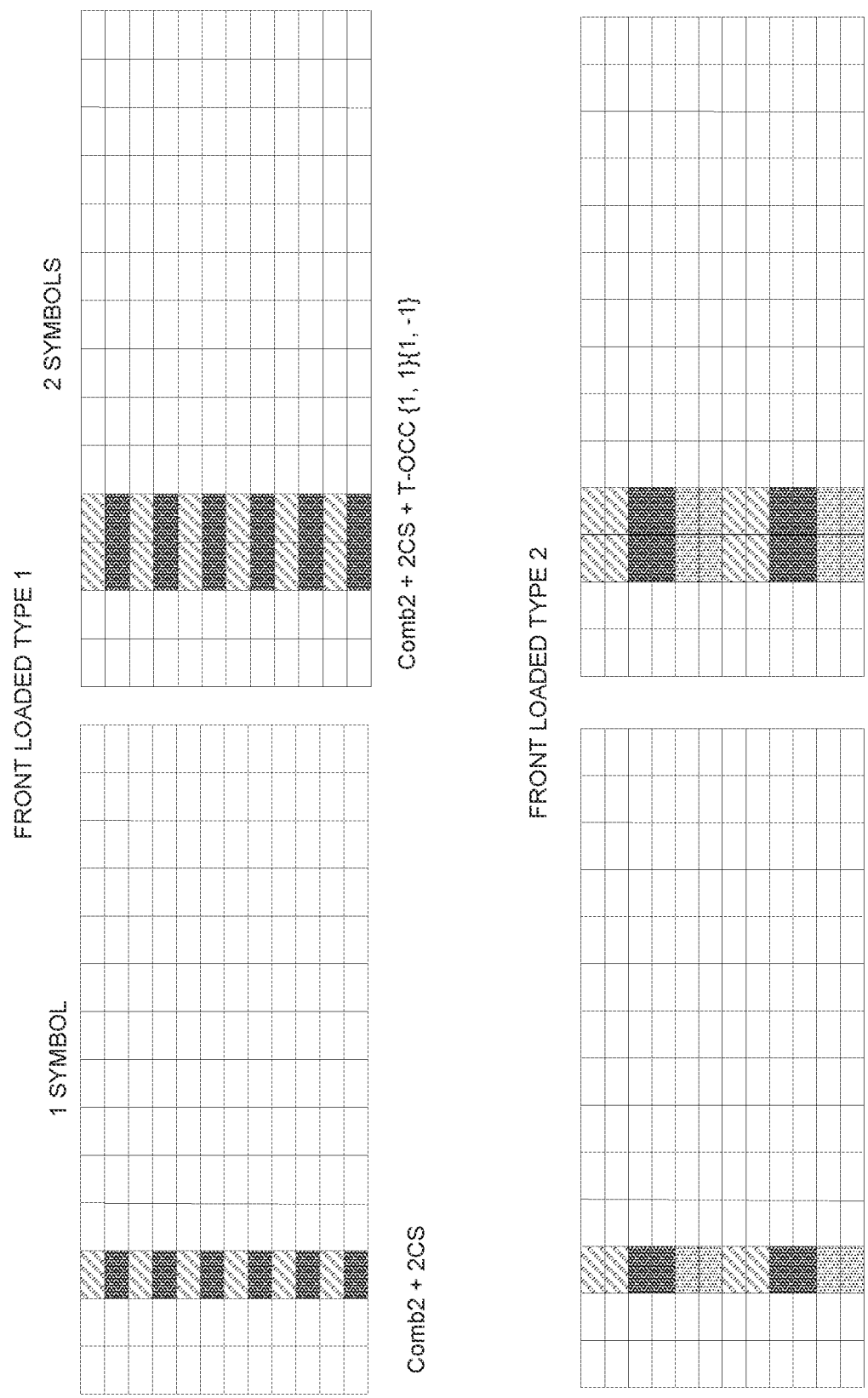
FIG. 2 illustrates DM-RS Type 1 and Type 2 with 1 or 2 adjacent DMRS symbols according to an embodiment.

FIG. 2 illustrates DM-RS type 1 and type 2 mapping with 1 or 2 adjacent DM-RS symbols. The different shaded areas represent different Code Divisional Multiplexing (CDM) groups. An antenna port is mapped to the Resource Elements (REs) within one CDM group only. Table 1 below illustrates how DM-RS ports are indicated for a Front Loaded Type 1 DM-RS with one OFDM symbol for DM-RS. Values in the range from 0-11 inclusive are signaled from the network to the UE using downlink control information (DCI). If the Value=0, then a single DM-RS port (i.e., DM-RS port 0) is used, and thus, a single layer transmission using DM-RS port 0 (SIMO). If Value=2 is signaled, then 2 layers of data are scheduled (MIMO), and DM-RS ports 0 and 1 are used for the two layers, respectively.

TABLE 1

Antenna port(s) (1000 + DM-RS port),
DL-DM-RS-config-type = 1,
DL-DM-RS-max-len = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

Moreover, with the DM-RS type 1 mapping supporting up to 4 orthogonal DM-RS ports (indexing the ports with 0, 1, 2 and 3), a single-layer transmission could use one of the four DM-RS ports {0},{1},{2},{3}. Additionally, a two-layer transmission could use one of the port pairs {0, 1}, {0, 2}, {0, 3}, {1, 2}, {1, 3}, {2, 3}, and a three-layer transmission could in principle use one of the port triples {0, 1, 2}, {0, 1, 3}, {0, 2, 3}, {1, 2, 3}. A four-layer transmission would use all the available DM-RS ports {0, 1, 2, 3}. When specifying port combinations to be signaled, only a subset of the possible combinations is specified according to Table 1 above such that for type 1 mapping (maximum 4 ports), the port pairs are restricted to {0, 1}, {2, 3}, {0, 2}, and a three-layer transmission is restricted to the ports {0, 1, 2}, while four layer transmission use all four ports. In NR, the DM-RS ports used in multi-layer transmissions are specified in 3GPP TS 38.212, where additional tables as the one shown in FIG. 2 for Front Loaded Type 2, and for the case of 2 DMRS symbols, are specified.

Table 2 illustrates an example of how 3GPP TS 38.211 defines which RE an antenna port is mapped to.

TABLE 2

Parameters for PDSCH DM-RS configuration type 1.

| | | | $w_f(k')$ | | $w_t(l')$ | |
|---|---|---|---|---|---|---|
| p | CDM group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

As seen in Table 2, there are 8 antenna ports ρ for DM-RS type 1 labeled 1000-1007. For each port p, a CDM group λ is given. This means that ports belonging to the same CDM group are mapped to the same group of resource elements, but separated by an orthogonal cover code in frequency (in cases where a single OFDM symbol is used for DMRS) or frequency+time (in cases where two OFDM symbols are used). The delta parameter Δ indicates the frequency shift in steps of REs. Therefore, port 1000 and port 1001 use even subcarriers (Δ=0) and are separated by a frequency domain cover code (+1 +1) and (+1 −1), respectively. From Table 1, it can be seen that a dual layer MIMO transmission can be selected by indicating Value=2 in the scheduling DCI.

Figure 3:
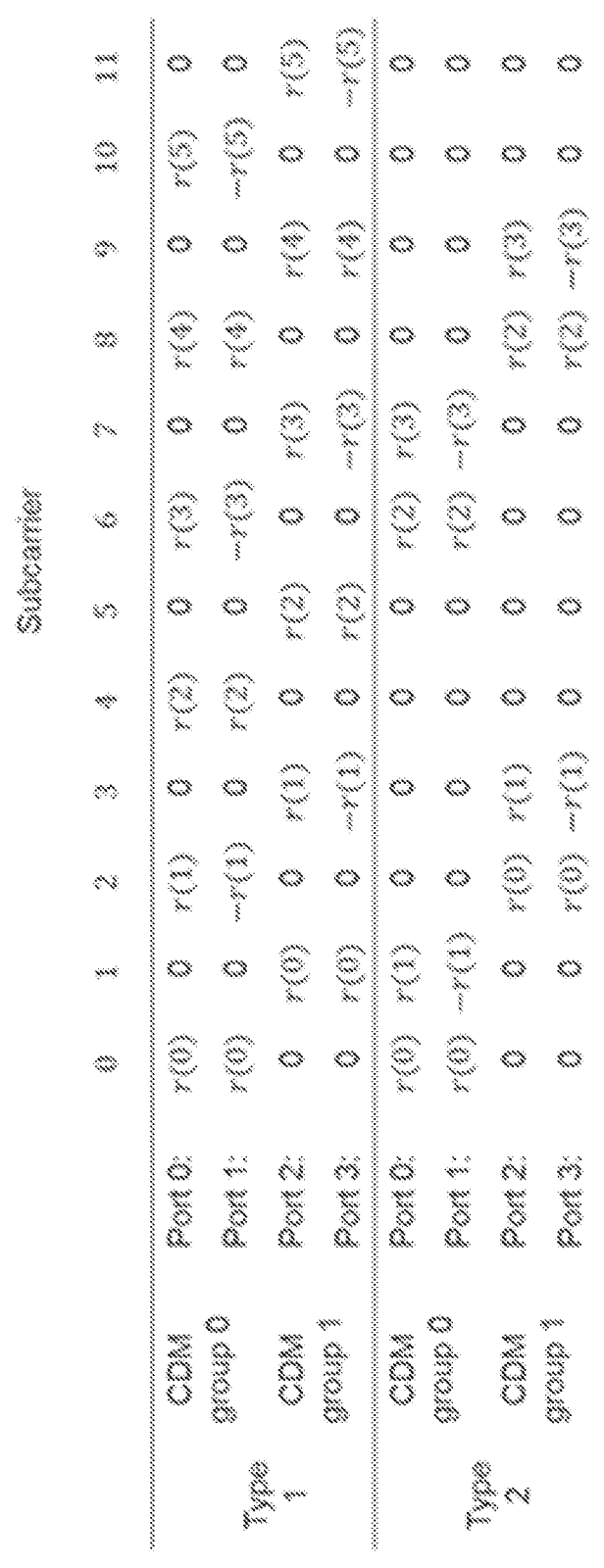

FIG. 3 illustrates NR mapping of four DM-RS ports on a resource block and on a single OFDM symbol, where the orthogonal cover codes (OCCs) of length-2 are used within each CDM group to orthogonalize the DM-RS sequences that are mapped on the same subcarriers. As seen in FIG. 3, Type 1 mapping of the DM-RS sequence (r(m), m=0, 1, . . . ) has a comb structure with two CDM groups, and further, has a denser pattern in the frequency-domain than the Type 2 mapping, which use three CDM groups.

Comb mapping is a prerequisite for transmissions requiring low PAPR/CM, and is therefore used in conjunction with DFT-spread-OFDM. In CP-OFDM, however, both DM-RS Type 1 and DM-RS Type 2 mapping are supported. Additionally, Type 2 mapping supports three CDM groups; however, in this example, CDM group 2 is not used. In other words, there is no type 2 mapping of DM-RS on subcarriers 4, 5, 10 and 11. Resource elements associated with a CDM group that are (occasionally) not used for DM-RS can be used for PDSCH/PUSCH to reduce overhead. In NR, the construction of reference signals and their mapping on resource elements are specified in 3GPP TS 38.211.

After layer-mapping, the DM-RS and associated PDSCH/PUSCH are mapped to physical antennas. The mapping can be described by a precoding matrix with the number of rows being equal to the number of physical antennas (or virtual antennas in case a specification transparent mapping is performed between virtual antennas and the physical antennas, for example a beamforming network) and the number of columns equal to the number of layers.

Therefore, the transmitted DM-RS is pre-coded to adjust the spatial phases of the transmitted signals such that received signals adds constructively at the intended receiver, and destructively at other, unintended receivers. Each DM-RS is pre-coded according to the associated column of the precoding matrix. The choice of pre-coder is typically based on channel state information (CSI) acquired either on the receiver side or on the transmitter side. The pre-coding could be wideband in the sense that the same pre-coder is applied to all subcarriers, or there could be one pre-coder per subcarrier. Typically, though, the pre-coder is fixed over a bundle of resource blocks. For the uplink, and at least in the cases of codebook-based uplink transmissions, the pre-coder may be indicated to the UE, and thus, is selected by the network. For the downlink, the pre-coder is standard transparent. As such, it is up to the network to select a pre-coder.

As mentioned above, in NR, as well as in LTE, a reference signal based on PRBS is constructed as:

$$r(m) = \frac{1}{\sqrt{2}}(1 - 2 \cdot c(2m)) + j\frac{1}{\sqrt{2}}(1 - 2 \cdot c(2m+1)), m = 0, 1, \ldots$$

where the PRBS c(i) is a Gold-31 sequence constructed from modulo-2 additions of two m-sequences, with each m-sequence being associated with a 31-bit linear feedback shift register (LFSR). The initial state of one of the LFSRs is fixed, whereas the initial state of the second LFSR, $c_{init}$, depends at least on the scrambling ID, $N_{ID}$, and the OFDM symbol within the radio frame at which the reference signal is sent. With $n_s$ and l denoting the slot index and the OFDM symbol index of a 14-symbols slot, respectively, this radio frame OFDM symbol can be expressed as t=14 $n_s$+l+1. The function determining the initial state $c_{init}$ will be reference signal type dependent.

In the case of an NR DM-RS, a 16-bit scrambling ID is either UE-specific, RRC configured, or defined by a default value that corresponds to the physical cell ID, $N_{ID}^{cell} \in \{0, 1, \ldots, 1007\}$. When the scrambling ID is RRC configured, two scrambling IDs are provided, $N_{ID}^{(0)}$ and $N_{ID}^{(1)}$. The particular scrambling IDs used is dynamically indicated by the parameter $n_{SCID} \in \{0, 1\}$.

The pseudo-random sequence generator shall be initialized with:

$$c_{init} = (2^{17}(N_{symb}^{slot}l+1)(2N_{ID}^{nSCID}+1) + 2N_{ID}^{nSCID} + n_{SCID}) \bmod 2^{31}$$

wherein: l is the OFDM symbol number within the slot;
$n_{s,f}^{\mu}$ is the slot number within a frame; and
$N_{ID}^{0}$, $N_{ID}^{1} \in \{0, 1, \ldots, 65535\}$ are given by the higher-layer parameters scramblingID0 and scramblingID1, respectively, in the DM-RS-UplinkConfig IE, if provided, and the PUSCH is scheduled by DCI format 0_1;
$N_{ID}^{0} \in \{0, 1, \ldots, 65535\}$ is given by the higher-layer parameter scrambling/D0 in the DM-RS-UplinkConfig IE, if provided, and the PUSCH is scheduled by DCI format 0_0 with the CRC scrambled by C-RNTI, MCS-C-RNTI, or CS-RNTI;
$N_{ID}^{nSCID}$ cell otherwise.

The $n_{SCID}$ parameter is used to be able to generate two different sequences (two different $c_{init}$) for DM-RS and this parameter is indicated by the scheduling of the DCI transmitted by PDCCH. Therefore, the gNB can dynamically indicate the $n_{SCID}$ parameter to the UE for PUSCH transmission or for PDSCH reception. This is useful, for example, when performing transmissions from different cells or transmission points (TRPs), where users served by one cell may use $n_{SCID}=0$ and users served by the other cell use $n_{SCID}=1$. So depending on the scheduler decision, $n_{SCID}$ is determined by network and signaled to the UE.

Thus, in NR multi-layer transmissions, the DM-RS sequence is mapped to resource elements so that the same sequence samples are reused in multiple CDM groups (see FIG. 3). Hence, the sequence is resource specific per CDM group. The same sequence can then be reused for the next CDM group in cases where the next CDM group is also used for transmission of DM-RS. However, together with pre-coding, this repetition of sequence samples can create very high peaks (high PAPR/CM) in the transmitted waveform. This will either incur very high requirements on the transmitter linearity (which increases cost), or causes severe degradation of transmit signal quality.

The present embodiments, however, addresses such issues by, inter alia, simplifying UE implementation. To simplify UE implementation, the pseudo-random generator outputs two $c_{init}$ values for scrambling code IDs $n_{SCID}=0$ and $n_{SCID}=1$. These two values are then used to generate the sequence for each of two CDM groups of antenna ports, respectively. Additionally, the $n_{SCID}$ flag that is indicated in the downlink control information (DCI) transmitted by PDCCH is used to toggle which $c_{init}$ value is used for which CDM group.

The present embodiments provide advantages and benefits that conventional solutions do not provide. One advantage is that the UE implementation supporting the generation of two $c_{init}$ values can be re-used. Additionally, the embodiments of the present disclosure allow for toggling the $n_{SCID}$ to use by DCI even though more than one CDM group is used for the DM-RS for the UE. Accordingly, in another advantage, multi-TRP transmission is still supported.

Further, embodiments of the present disclosure enhance DM-RS in order to reduce the PAPR to the same level as for data symbols. The $c_{init}$ used to generate DM-RS sequences for data demodulation for PDSCH or PUSCH are different for each CDM group and depends on the signaled $n_{SCID}$ parameter in the scheduling DCI message. In one embodiment, the $c_{init}$ mapping to CDM group is mapped differently to the used CDM groups depending on the signaled value of $n_{SCID}=0$ or $n_{SCID}=1$.

Figure 4A:
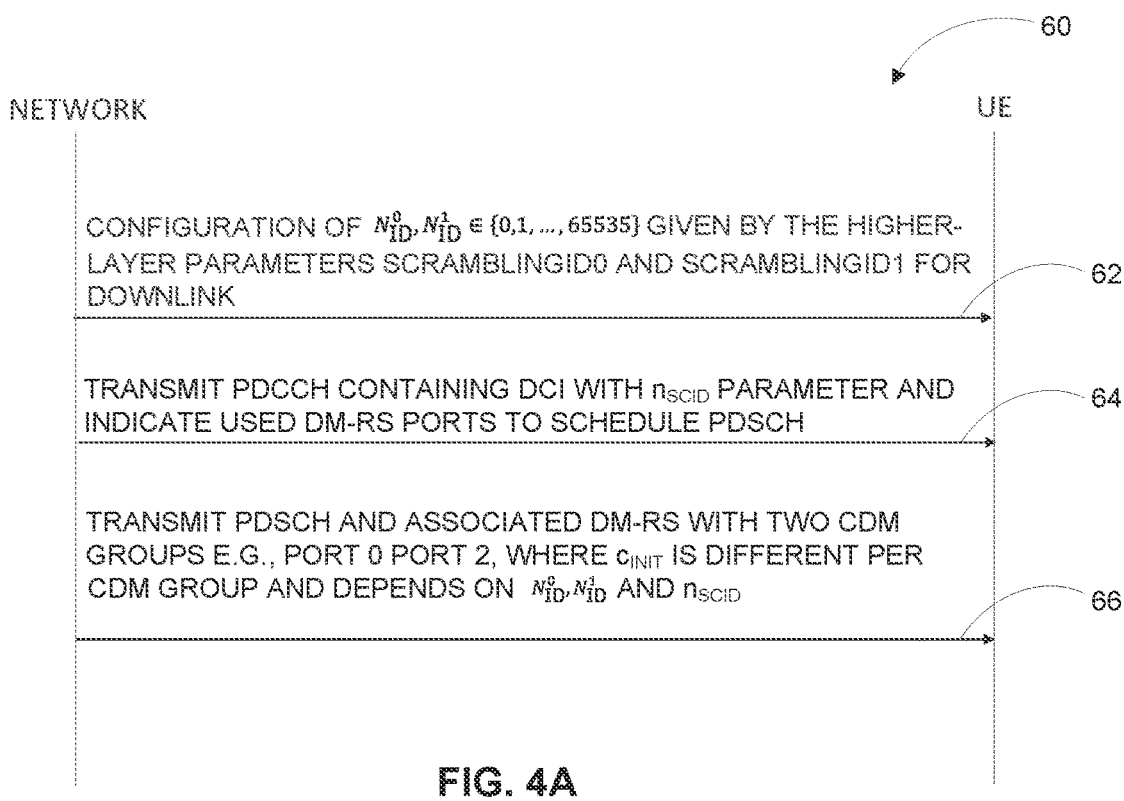
FIGS. 4A-4B are signaling diagrams illustrating the signaling between the network and a UE according to one embodiment.

FIG. 4A is a signaling diagram 60 illustrating the PDSCH scheduling according to one embodiment. As seen in FIG. 4A, a Radio Resource Control (RRC) message first configures first and second parameters (e.g., first and cell ID parameters $N_{ID}^{0}, N_{ID}^{1}$, respectively) based on the scrambling IDs for the downlink (line 62). The network then uses the DCI to transmit the PDCCH and indicate the used DM-RS ports to schedule the PDSCH (line 64). The DCI includes the $n_{SCID}$ parameter. The network then transmits the PDSCH and the associated DM-RS with first and second CDM groups (e.g., port 0 and port 2). In these cases, the first and second parameters $c_{init}$ are different per CDM group, and depend on the first and second parameters (e.g., the first and second cell IDs $N_{ID}^{0}, N_{ID}^{1}$), and the scrambling code ID $n_{SCID}$ (box 66). The UE then generates a first demodulation sequence (e.g., a DM-RS sequence) based on one of the first and second parameters (e.g., one of the two $c_{init}$ parameter values) obtained by the scrambling code ID (e.g., $n_{SCID}=0$, 1), and maps the first demodulation sequence to a DM-RS port in the first or second CDM group depending on $n_{SCID}$. A second demodulation sequence is also generated based on the other of the first and second parameters and used for the other of the first and second CDM groups.

Figure 4B:
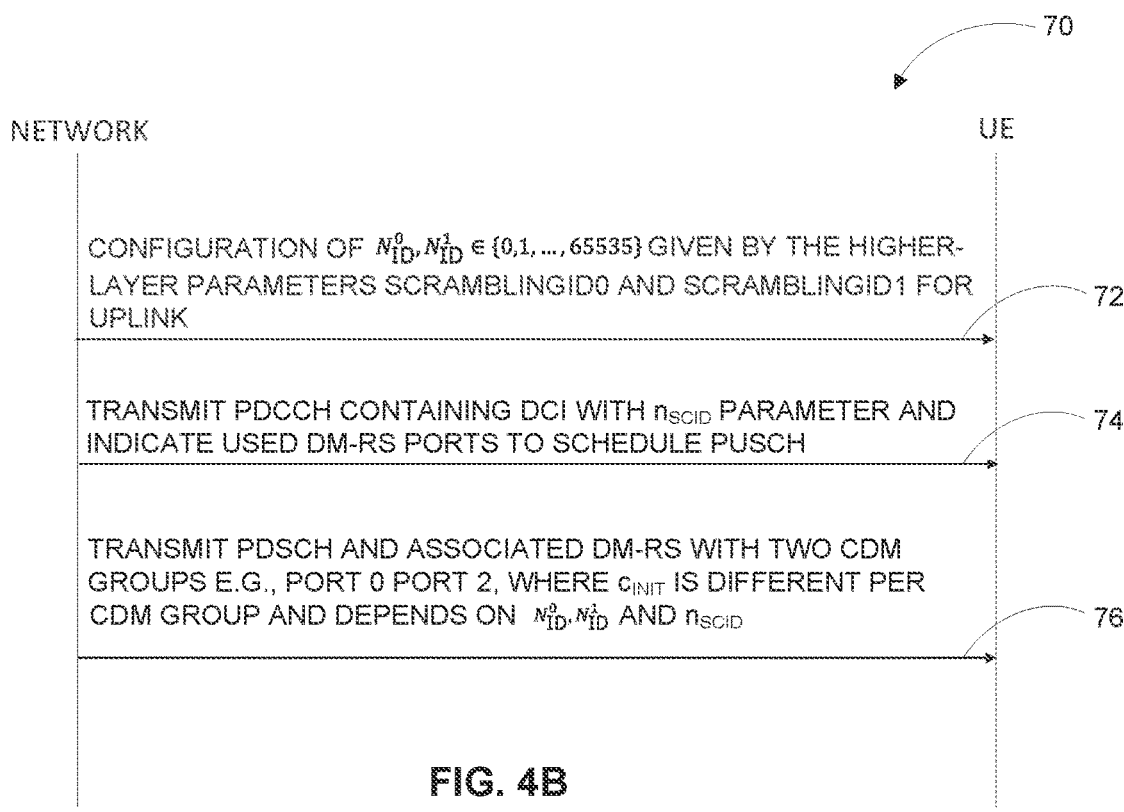

FIG. 4B is a signaling diagram 70 illustrating an equivalent operation (i.e., lines 72, 74, 76) for the uplink to schedule PUSCH according to one embodiment. In more detail, the two $c_{init}$ values (using corresponding values $n_{SCID}$=0, 1) in Rel-15 are used for port(s) in each of the two CDM groups, respectively, for situations where there are two CDM groups (i.e., DM-RS configuration type 1). Additionally, the $n_{SCID}$ parameter signaled in DCI is used to toggle the mapping of $c_{init}$ to different CDM groups.

As seen in FIG. 4B, a Radio Resource Control (RRC) message first configures the first and second parameters (e.g., the first and second cell ID parameters $N_{ID}^0, N_{ID}^1$) based on the scrambling code IDs for the UPLINK (line 72). The network then uses the DCI to transmit the PDCCH and indicate the used DM-RS ports to schedule the PUSCH (line 74). As above, the DCI includes the $n_{SCID}$ parameter. The network then transmits the PDSCH and associates the DM-RS with first and second CDM groups (e.g., port 0 and port 2). In these cases, the first and second initialization values $c_{init}$ are different per CDM group, and depend on the cell IDs $N_{ID}^0, N_{ID}^1$, and the scrambling code ID $n_{SCID}$ (box 76). The UE then generates the first demodulation sequence based on one of the first and second parameters (e.g., one of the two $c_{init}$ values) obtained by the scrambling code ID (e.g., $n_{SCID}$=0, 1), and maps the first demodulation sequence to a first DM-RS port in the first or second CDM group depending on $n_{SC}$ID. The UE also generates a second demodulation sequence based on the other of the first and second parameters, and uses it for the second CDM group.

Embodiment for DM-RS Type 1 (Two CDM Groups)

For CDM group λ=0, the DM-RS sequence is generated using $c_{init}$ as in Rel-15, and using the signaled $n_{SCID}$ (referred to herein as "$n_{SCID}^{(signaled)}$") in the DCI. For CDM group λ=1, the DM-RS sequence is generated using $c_{init}$ as in Rel-15 and using $n_{SCID}^{(signaled)}$ in the DCI. However, the $n_{SCID}$ that is actually used for sequence generation is $n_{SCID}(1)=1-n_{SCID}^{(signaled)}$ to generate $c_{init}$ for this CDM group. Therefore, if $n_{SCID}$=1 is signaled, then $n_{SCID}$=1 is used for CDM group 0, and $n_{SCID}$=0 is used for CDM group 1.

To generalize the embodiment, the values for $c_{init}$ are different for each CDM group and depend on $n_{SCID}^{(signaled)}$ in the scheduling DCI message. In one embodiment, the $c_{init}$ changes places between the CDM groups depending on whether $n_{SCID}$=0 or $n_{SCID}$=1. Thus, for a first CDM Group, $n_{SCID}(0)=n_{SCID}^{(signaled)}$. For a second CDM group, $n_{SCID}^{(1)}=1-n_{SCID}^{(signaled)}$.

Embodiment for DMRS Type 2 (Three CDM Groups)

A UE using rank 1-4 reception or transmission is only using two out of three CDM groups. As such, the present embodiments can also be applied to this case as well.

Particularly, for a first CDM group λ1 used for PDSCH, DM-RS, or PUSCH DM-RS, the DM-RS sequence is generated using:
$c_{init}$ as specified in Rel-15; and
the signaled $n_{SCID}$ (referred to herein as "$n_{SCID}^{(signaled)}$") in the DCI.

For a second CDM group λ₂, used for PUSCH DM-RS or PDSCH DM-RS, the DM-RS sequence is generated using:
$c_{init}$ as specified in Rel-15; and the signaled $n_{SCID}$ in the DCI. However, the $n_{SCID}$ actually used for sequence generation is $n_{SCID}^{(1)}=1-n_{SCID}^{(signaled)}$ to generate $c_{init}$ for this CDM group. Hence, if $n_{SCID}$=1 is signaled, then n $n_{SCID}$=1 is used for CDM group $\lambda_1$ and $n_{SCID}$=0 is used for CDM group $\lambda_2$.

Thus, in this second embodiment, values for $c_{init}$ are different for each CDM group and depend on the signaled $n_{SCID}$ parameter in the scheduling DCI message ($n_{SCID}^{(signaled)}$)) In one embodiment, the $c_{init}$ changes places between the used CDM groups depending on $n_{SCID}$=0 or $n_{SCID}$=1. Therefore, for a first CDM Group $n_{SCID}^{(0)}=n_{SCID}^{(signaled)}$. For a second CDM group, $n_{SCID}^{(1)}=1-n_{SCID}^{(signaled)}$.

Figure 5:
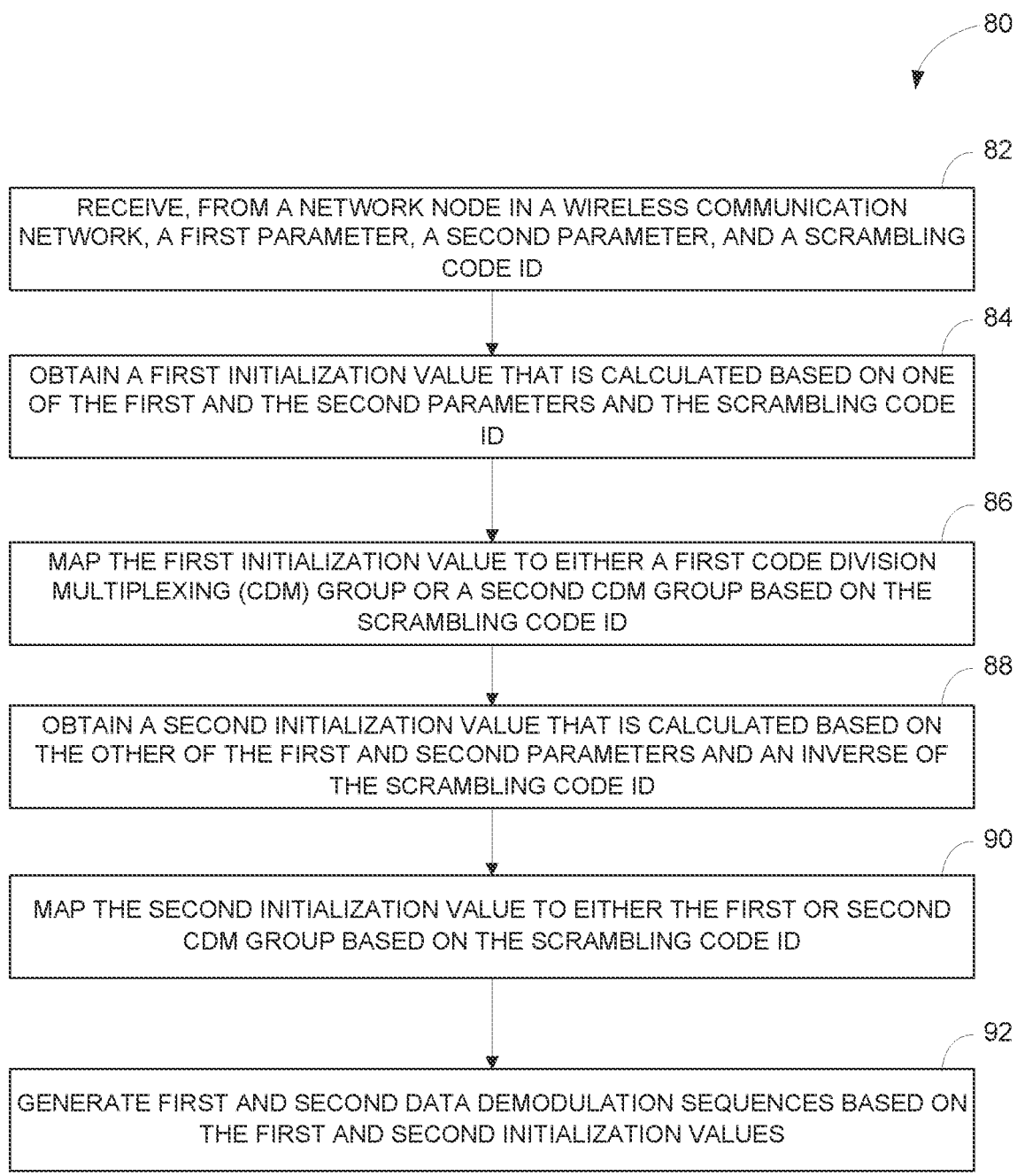
FIG. 5 illustrates a method implemented by a UE according to an embodiment.

FIG. 5 illustrates an exemplary method 80 performed by a UE 30 according to an embodiment.

Method 80 calls for the UE 30 receiving, from a network node in a wireless communication network, a first parameter (e.g., a first cell ID $N_{IE}^0$), a second parameter (e.g., a second cell ID $N_{ID}^1$), and a scrambling code ID (e.g., $n_{SCID}$) (box 82). The UE then obtains a first initialization value (e.g., $c_{init}$) that is calculated based on one of the first and second parameters, and the scrambling code ID (box 84), and maps the first initialization value $c_{init}$ to either a first Code Division Multiplexing (CDM) group or a second CDM group based on the scrambling code ID $n_{SCID}$ (box 86).

Additionally, in some embodiments, method 80 also calls for the UE 30 obtaining a second initialization value $c_{init}$ that is calculated based on the other of the first and second parameters (e.g., the other of the first and second cell IDs $N_{ID}^0, N_{ID}^1$), and the inverse of the scrambling code ID (e.g., $1-n_{SCID}$) (box 88), and maps the second initialization value $c_{init}$ to either the first or second CDM group based on the scrambling code ID (box 90). In some embodiments, method 80 then calls for generating first and second data demodulation sequences based on the first and second initialization values (box 92).

In some embodiments of method 80, the first and second parameters are received in a Radio Resource Control (RRC) message from the network node. Additionally, the scrambling code ID is received in Downlink Control Information (DCI) from the network node.

In some embodiments, obtaining the first initialization value comprises calculating the first initialization value based on the one of the first and a second parameters and the scrambling code ID.

Additionally, in some embodiments of method 80, obtaining the second initialization value comprises calculating the second initialization value based on the other of the first and second parameters and the inverse of the scrambling code ID.

In at least one embodiment, the first and second parameters are selected by the UE based on the scrambling code ID.

In some embodiments, method 80 further comprises generating first and second data demodulation sequences based on the first and second initialization values.

In such embodiments, the first and second data demodulation sequences comprise DM-RS sequences.

In some embodiments of method 80, the first and second initialization values are first and second $c_{init}$ values.

Further, in some embodiments, the first and second initialization values are mapped to corresponding ports in the first and second CDM groups.

In such embodiments, the first CDM group is different than the second CDM group.

In at least one embodiment of method 80, the network node comprises a base station.

Further, in some embodiments, one of the first and second groups is used for an uplink channel.

In such embodiments, the one of the first and second groups is used for PUSCH DM-RS.

In other embodiments of method 80, one of the first and second groups are used for a downlink channel.

In these embodiments, the one of the first and second groups is used for PDSCH DM-RS.

In at least one embodiment, the first and second parameters are first and second cell IDs, respectively.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
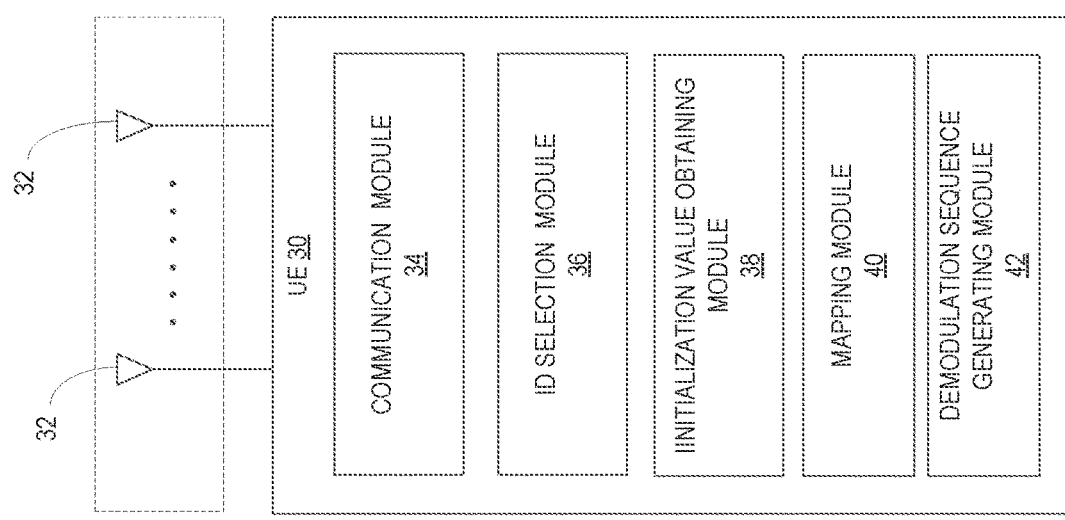
FIG. 6 is a schematic block diagram of an exemplary UE according to an embodiment.

FIG. 6 illustrates a UE 30 in accordance with one or more embodiments. The UE 30 comprises one or more antennas 32, a communication module 34, an ID selection module 36, an initialization value obtaining module 38, a mapping module 40 and a demodulation sequence generating module 42. The various modules 32, 34, 36, 38, 40, and 42 can be implemented by hardware and/or by software code that is executed by one or more processors or processing circuits.

The mapping module 40 is configured to map the first and second initialization values to respective first and second CDM groups based on the scrambling code ID received from the network node. The demodulation sequence generating module 42 is configured to generate first and second data demodulation sequences based on the first and second initialization values. In one embodiment, as previously stated, the first and second data demodulation sequences comprise DM-RS sequences.

The communication module 34 is configured to communicate signals and data with one or more nodes in the wireless communication network. Such communications include, but are not limited to, receiving multiple parameters (e.g., the first and second cell IDs), scrambling code IDs, and other information from a network node, such as a base station, for example. In at least one embodiment, the communication module 34 is configured to receive the first and second parameters (e.g., first and second cell IDs) in a Radio Resource Control (RRC) message, and the scrambling code ID in Downlink Control Information (DCI). The ID selection module 36 is configured to select the first and second parameters based on the scrambling code ID. The initialization value obtaining module 38 is configured to obtain first and second initialization values based on the first and second parameters, the scrambling code ID, and the inverse of the scrambling code ID, as previously described. In at least one embodiment, the initialization value obtaining module 38 is configured to calculate the first initialization value based on either the first or the second parameter and the scrambling code ID, and calculate the second initialization value based on the other of the first and second cell ID and the inverse of the scrambling code ID.

Figure 7:
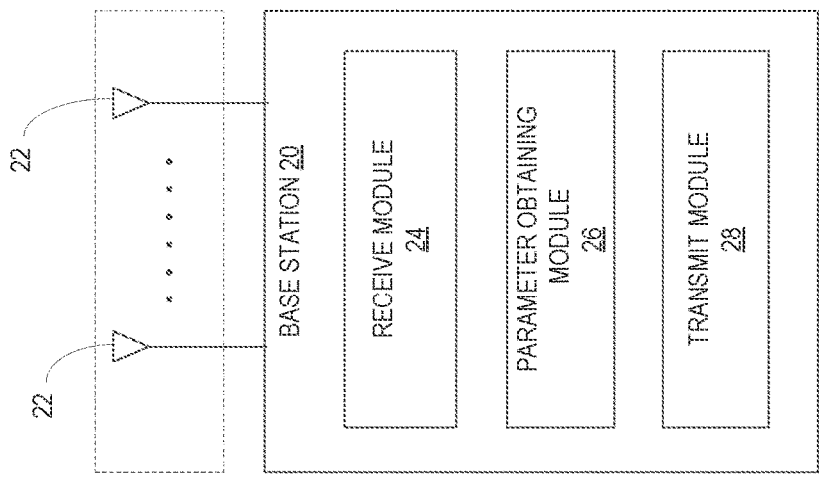
FIG. 7 is a schematic block diagram of an exemplary base station according to an embodiment.

FIG. 7 illustrates a base station 20 in accordance with one or more embodiments. The base station 20 comprises one or more antennas 22, a receive module 24, a parameter obtaining module 26, and a transmit module 28. The various modules 24, 26, and 28 can be implemented by hardware and/or by software code that is executed by a processor or processing circuit. The receive module 24 is configured to receive communication signals and data from the UE 30. The parameter obtaining module 26 is configured to obtain the parameters that are sent to the UE 30 in the RRC messages and the DCI. In one embodiment, for example, the parameter obtaining module 26 of base station 20 is configured to obtain the first and second parameters and the scrambling code ID. The transmit module 28 is configured to transmit the first and second parameters and the scrambling code ID obtained by the parameter obtaining module 26 to the UE 30 in RRC messages and the DCI, as previously described.

Figure 8:
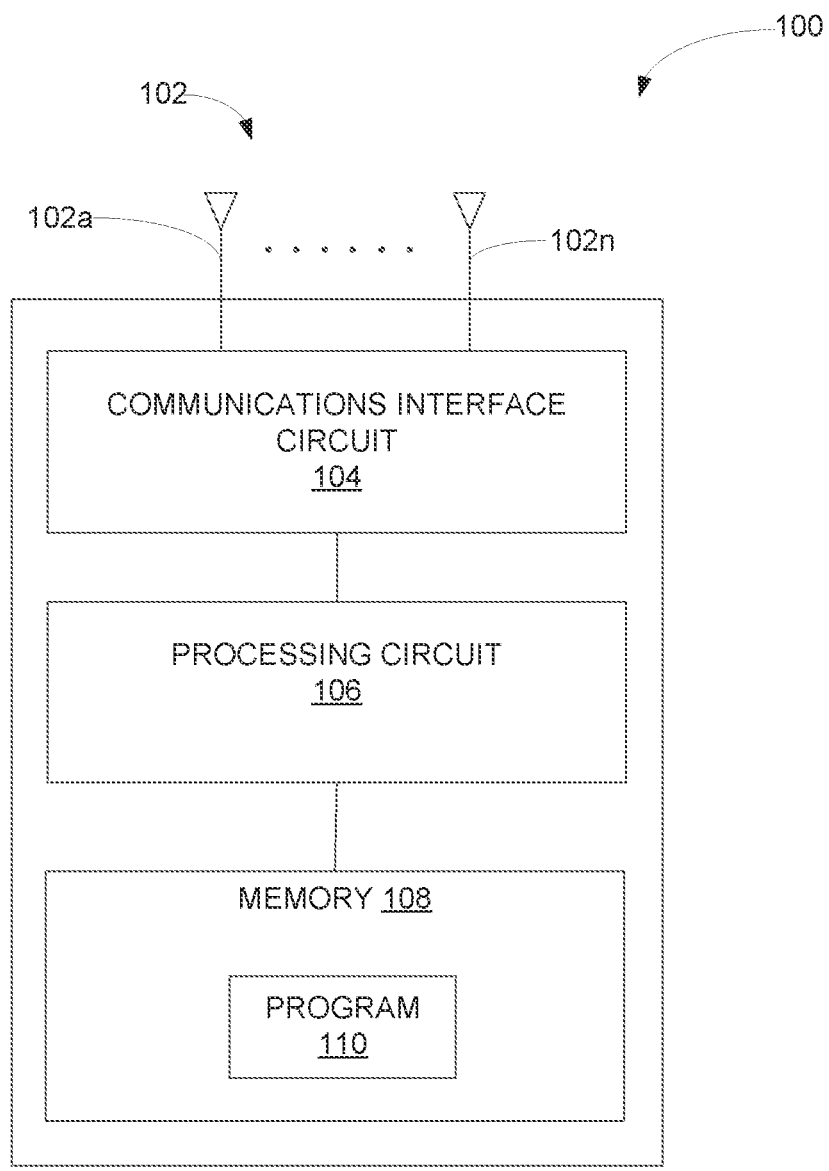
FIG. 8 is a functional block diagram of a wireless terminal that can be configured as a UE or base station according to an embodiment.

FIG. 8 illustrates a radio node 100 according to one embodiment that may be configured to function as a network node (e.g., base station 20) or a UE 30 as herein described. The radio node 100 comprises an antenna array 102 with multiple antenna elements 102a . . . 102n, a communications interface circuit 104, a processing circuit 106, and memory 108.

The communications interface circuit 104 is coupled to the antennas 102a . . . 102n and comprises the radio frequency (RF) circuitry needed for transmitting and receiving signals over a wireless communication channel. The processing circuit 106 controls the overall operation of the radio node 100 and processes the signals transmitted to or received by the radio node 100. Such processing includes coding and modulation of transmitted data signals, and the demodulation and decoding of received data signals. The processing circuit 106 may comprise one or more microprocessors, hardware, firmware, or a combination thereof.

Memory 108 comprises both volatile and non-volatile memory for storing computer program code and data needed by the processing circuit 106 for operation. Memory 108 may comprise any tangible, non-transitory computer-readable storage medium for storing data including electronic, magnetic, optical, electromagnetic, or semiconductor data storage. Memory 108 stores a computer program 110 comprising executable instructions that configure the processing circuit 106 to implement method 80 for a UE 30 according to FIG. 5, as described herein. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 110 for configuring the processing circuit 108 as herein described may be stored in a removable memory, such as a portable compact disc, portable digital video disc, or other removable media. The computer program 110 may also be embodied in a carrier such as an electronic signal, optical signal, radio signal, or computer readable storage medium.

Figure 9:
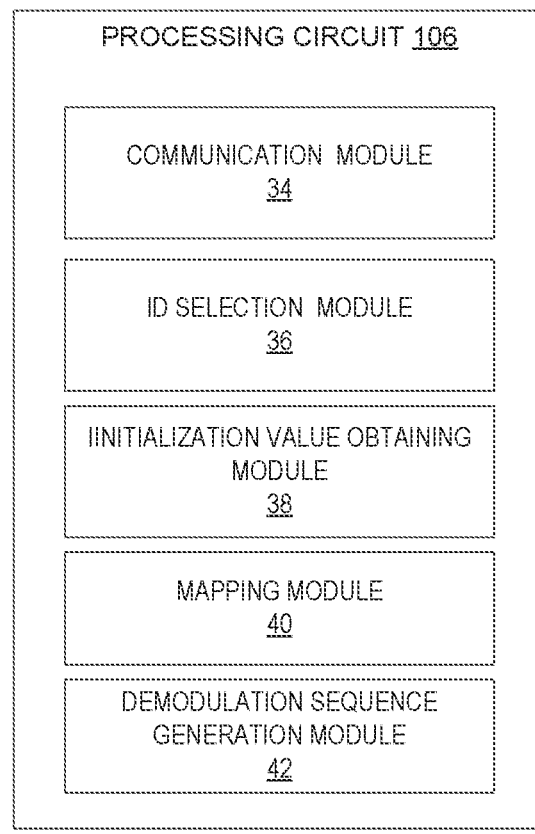
FIG. 9 is a schematic block diagram of an exemplary UE according to an embodiment.

FIG. 9 illustrates the processing circuit 106 for UE 30 in accordance with one or more embodiments. The processing circuit 106 comprises the communication module 34, the ID selection module 36, the initialization value obtaining module 38, the mapping module 40, and the demodulation sequence generating module 42. The various modules 32, 34, 36, 38, 40, and 42 configure processing circuit 106 to function as previously described, and can be implemented by hardware and/or by software code that is executed by one or more processing circuits 106.

Figure 10:
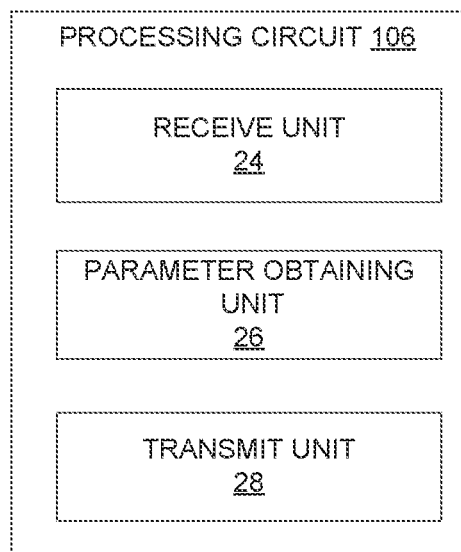
FIG. 10 is a schematic block diagram of an exemplary base station according to an embodiment.

FIG. 10 illustrates processing circuit 106 for a network node, such as base station 20, in accordance with one or more embodiments. In this embodiment, the processing circuit 106 comprises the receive module 24, the parameter obtaining module 26, and the transmit module 28. The various modules 24, 26, and 28 configure processing circuit 106 to function as previously described, and can be implemented by hardware and/or by software code that is executed by one or more processing circuits 106.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 11:
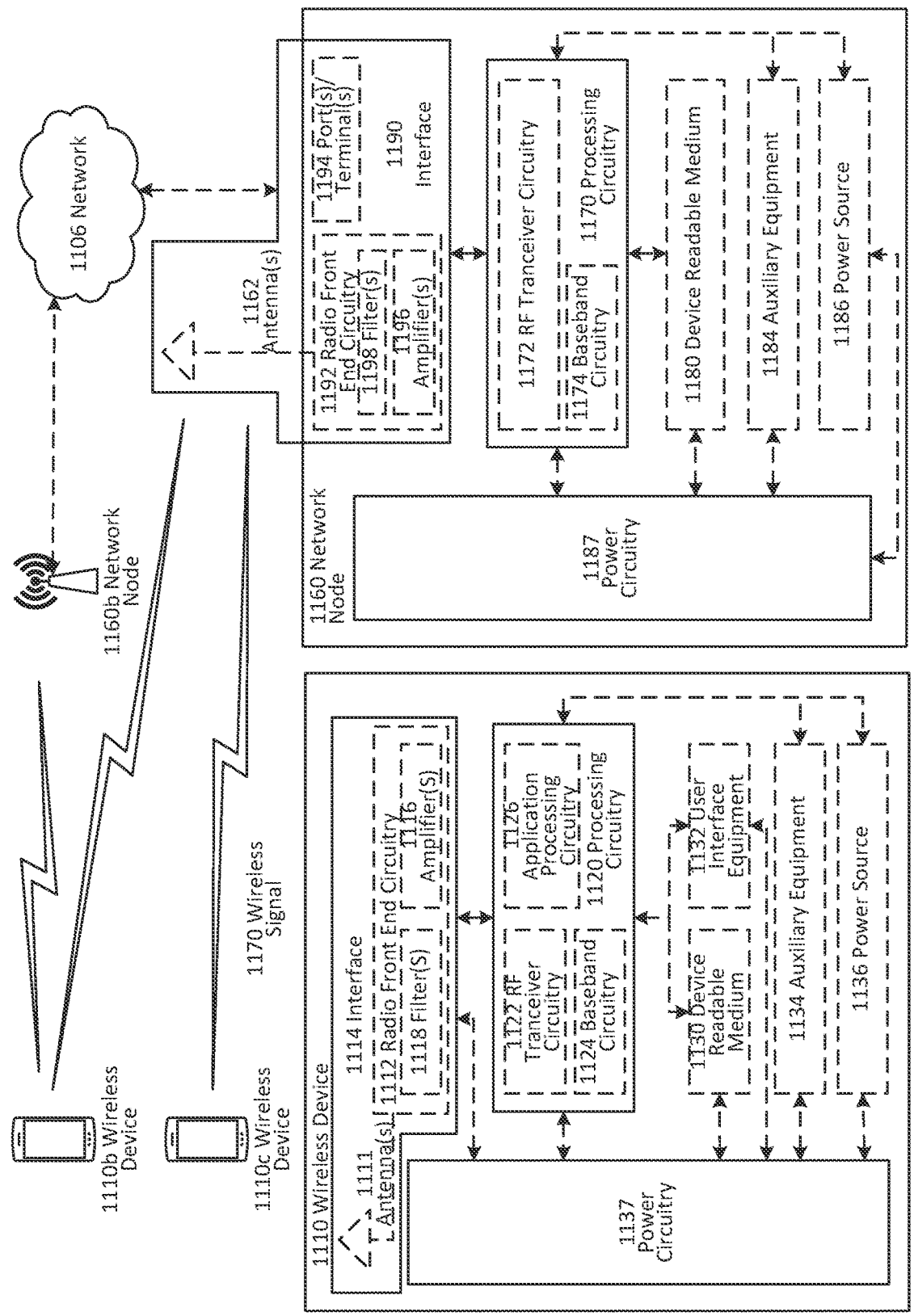
FIG. 11 illustrates an example wireless network according to one embodiment.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SoC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196.

Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SoC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
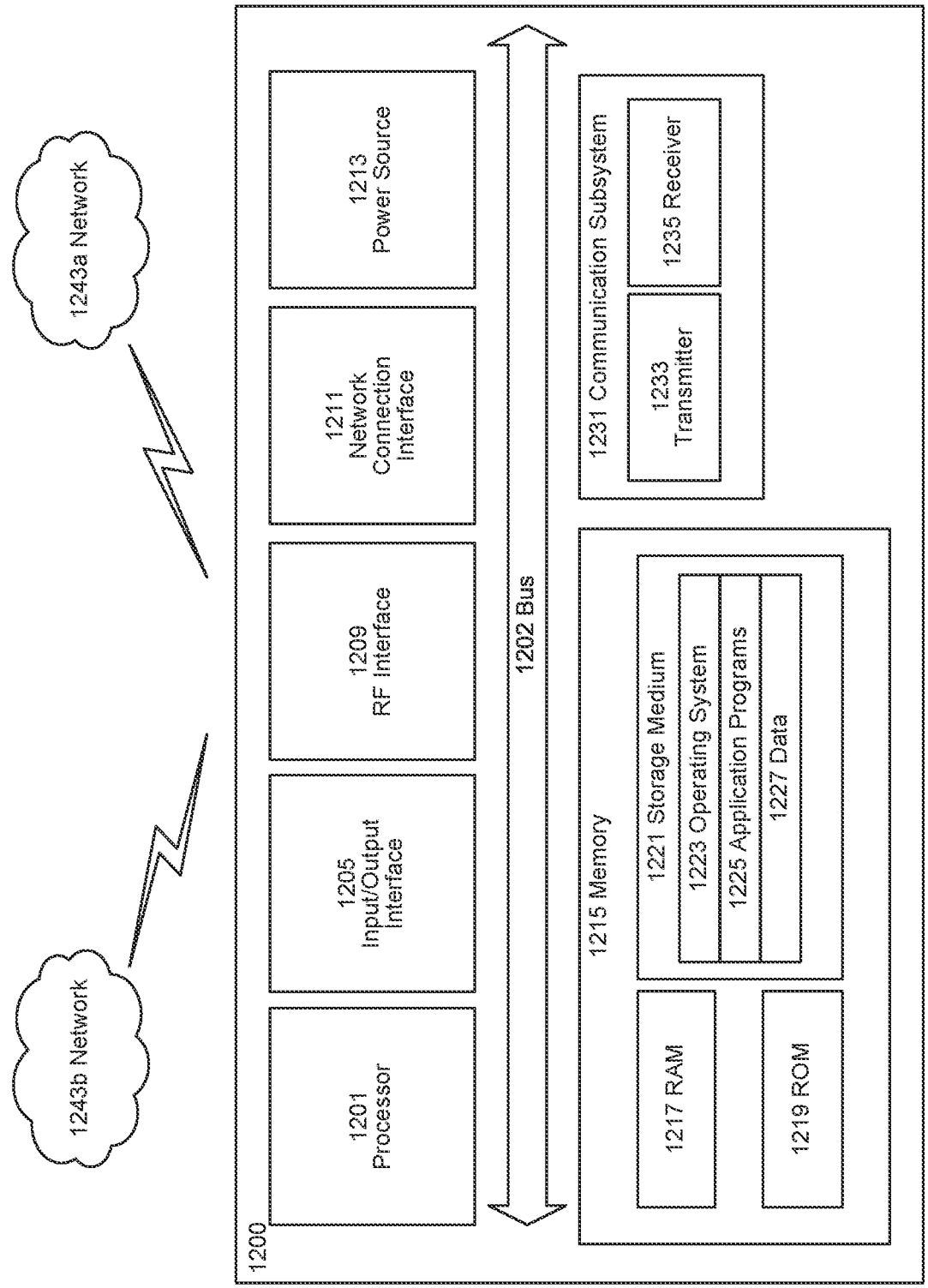
FIG. 12 illustrates one embodiment of a UE according to one embodiment.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity module (SIM/RUIM), other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMAX, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
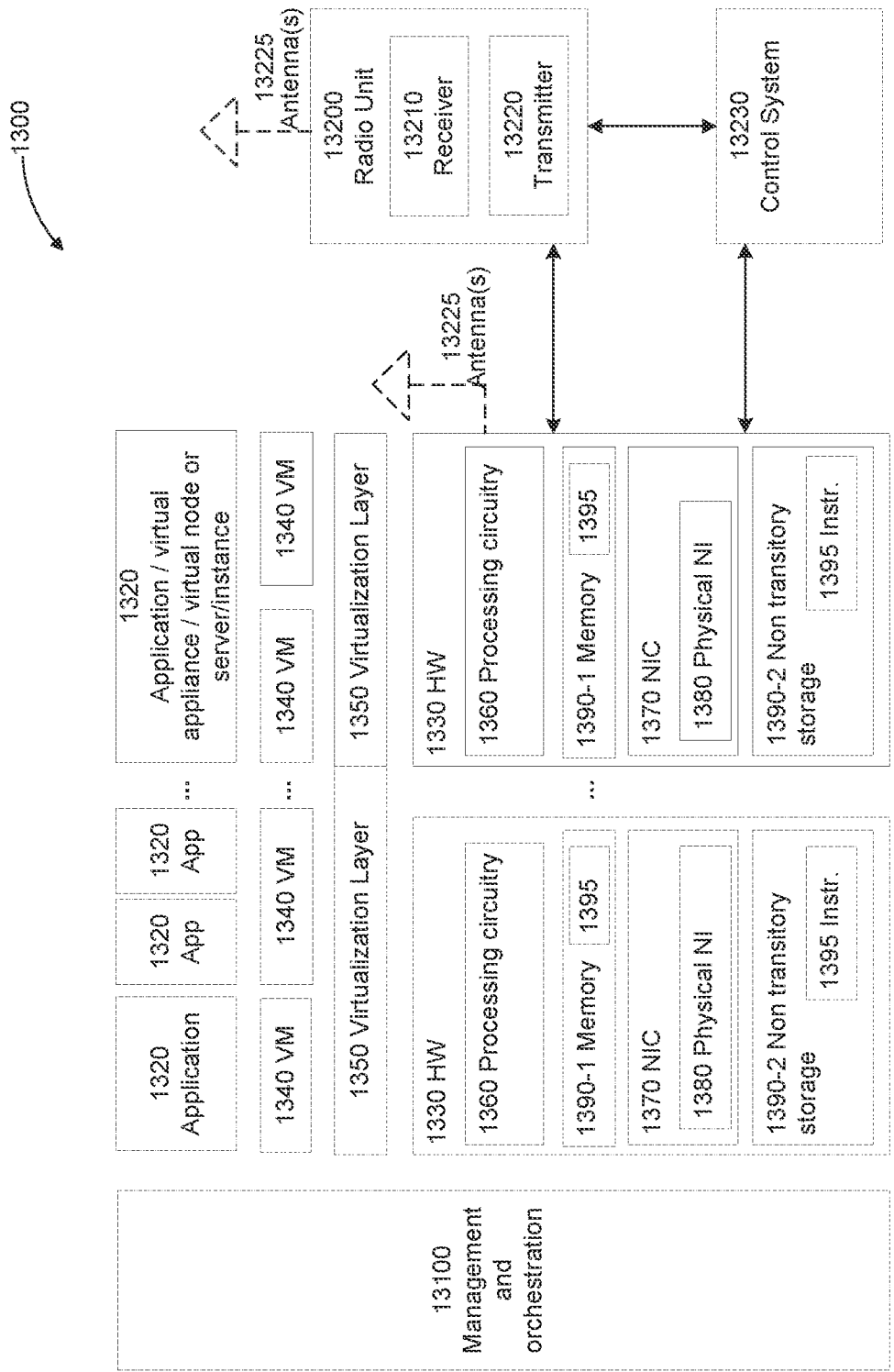
FIG. 13 is a schematic block diagram illustrating a virtualization environment in which functions implemented by some embodiments may be virtualized according to one embodiment.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 14:
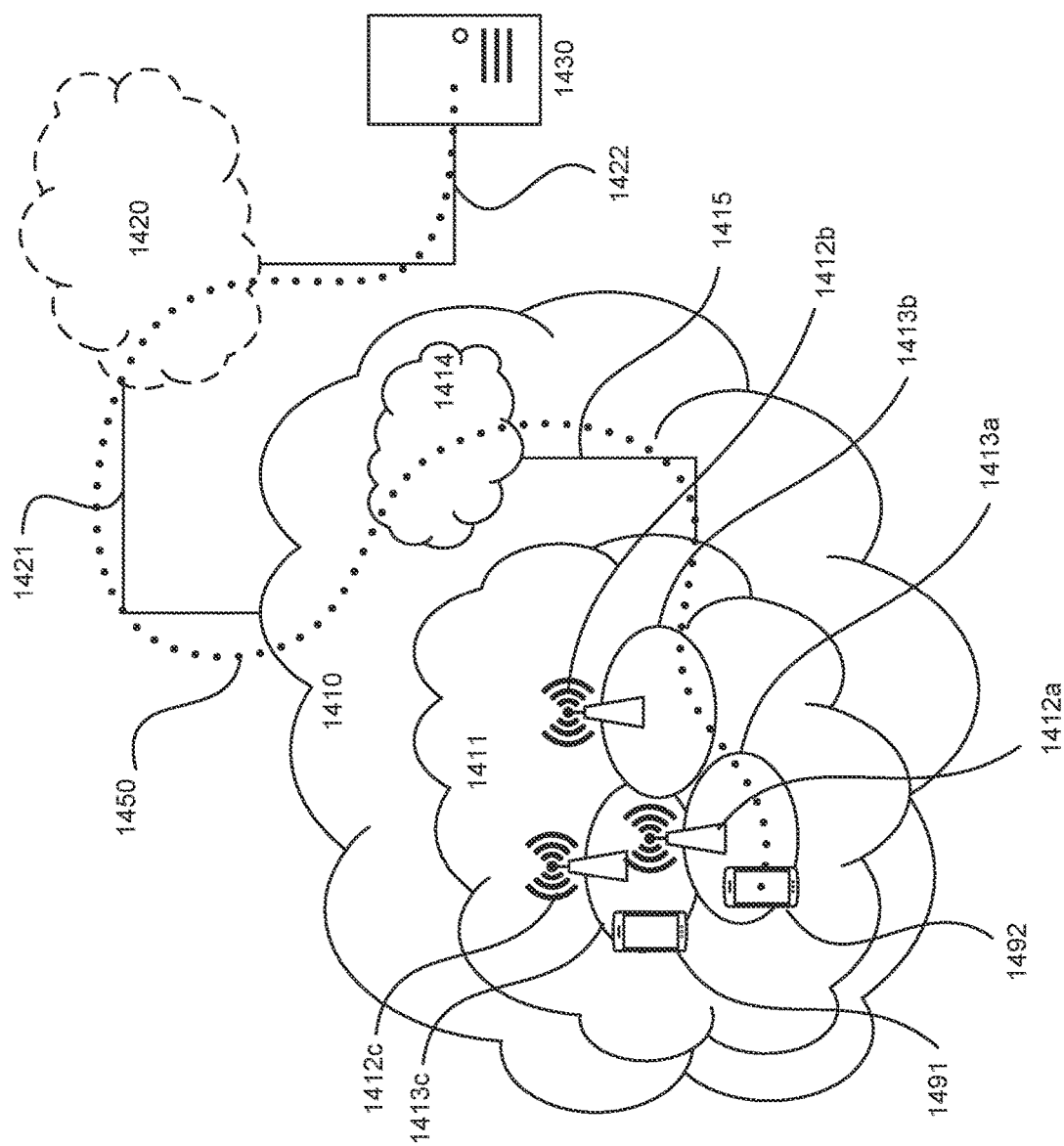
FIG. 14 illustrates a telecommunication network connected via an intermediate network to a host computer according to one embodiment.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
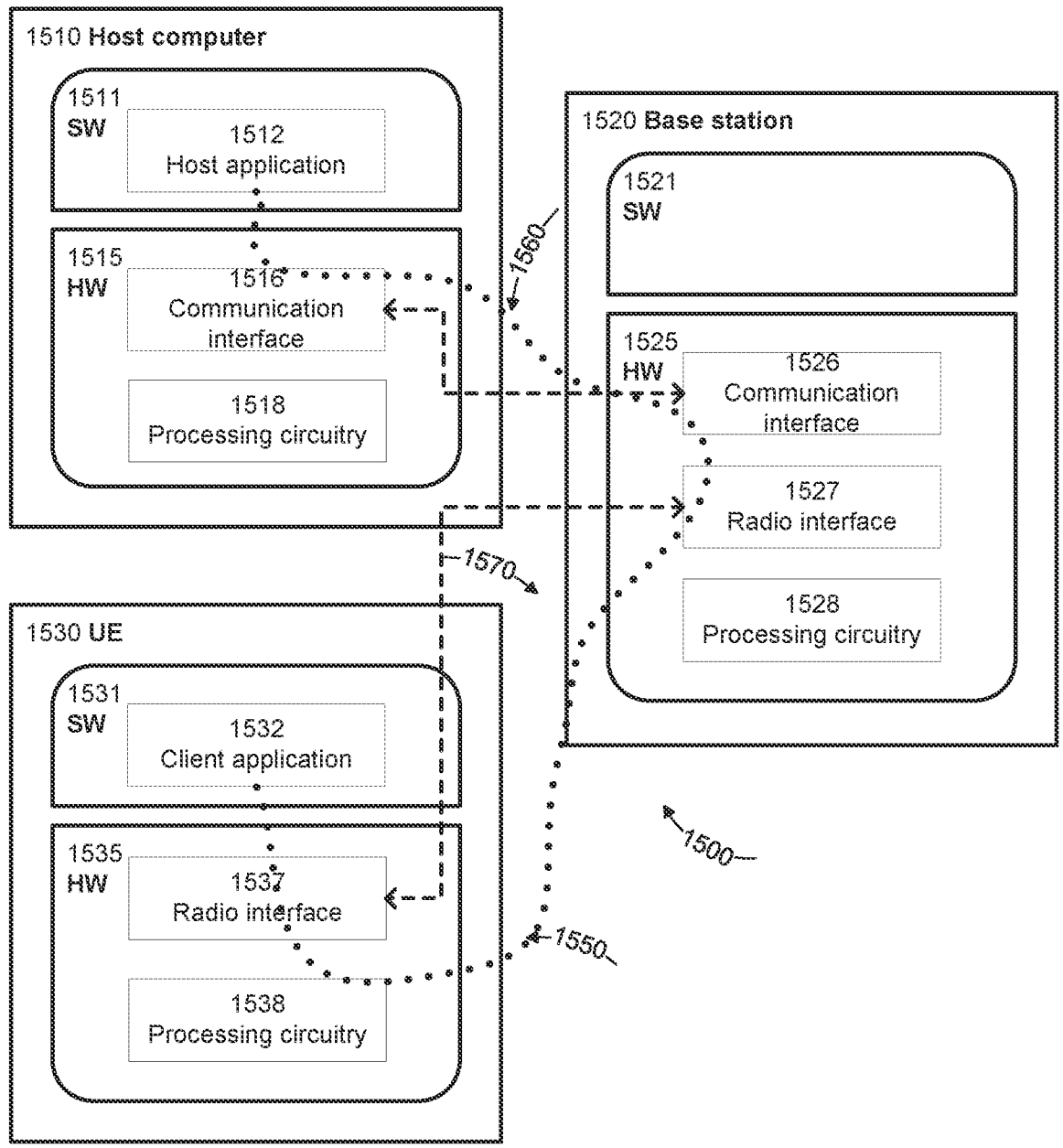
FIG. 15 illustrates host computer communicating via a base station with a user equipment over a partially wireless connection according to one embodiment.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments provide an advantage over conventional methods in that the UE implementation that supports generating two $c_{init}$ can be re-used. In addition, the present embodiments allow for toggling the $n_{SCID}$ to use by DCI even though more than one CDM group is used for the DM-RS for the UE. Hence, one advantage is that multi-TRP transmission is still supported. Additionally, the present embodiments negate the need for increasing the linearity requirements on the transmitter, thereby lowering costs, and help preventing the degradation of transmit signal quality.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
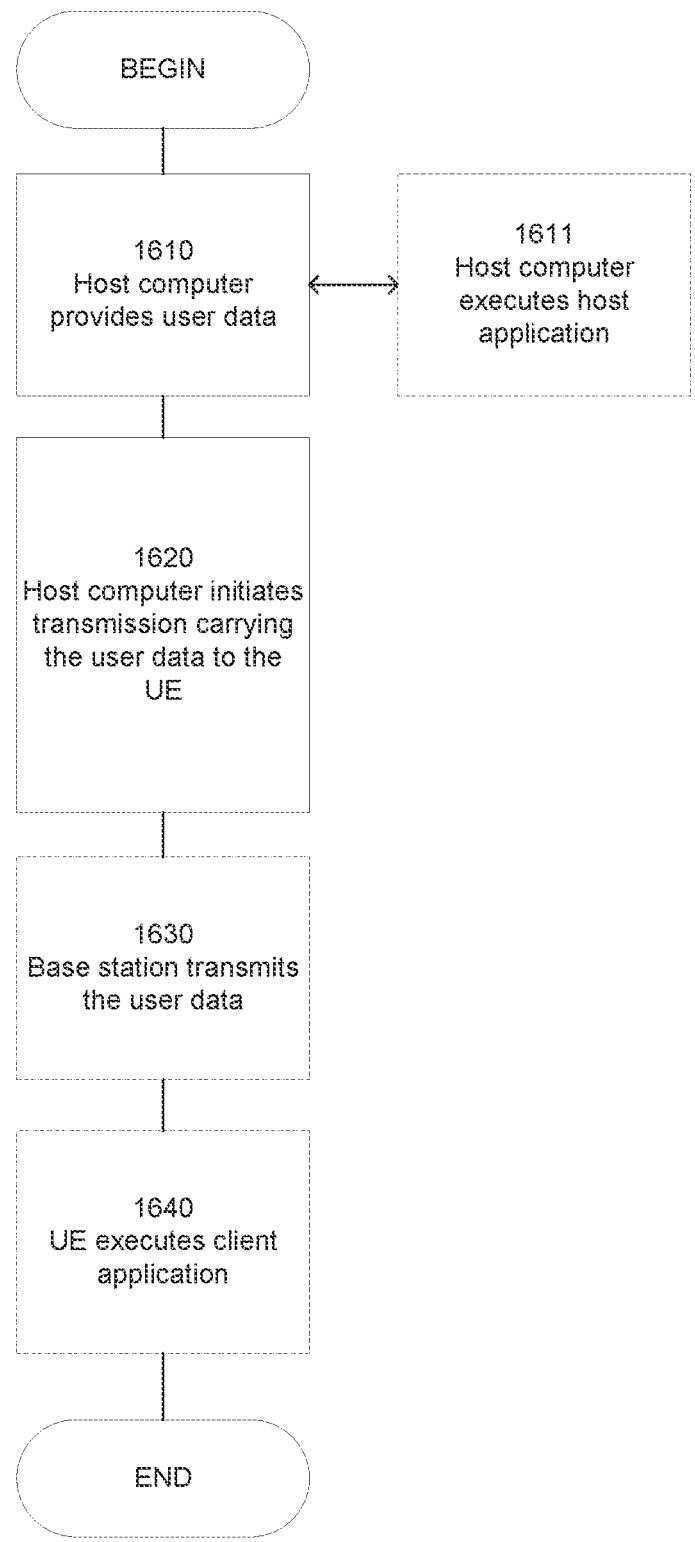
FIG. 16 is a flowchart illustrating a method implemented in a communication system according to one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
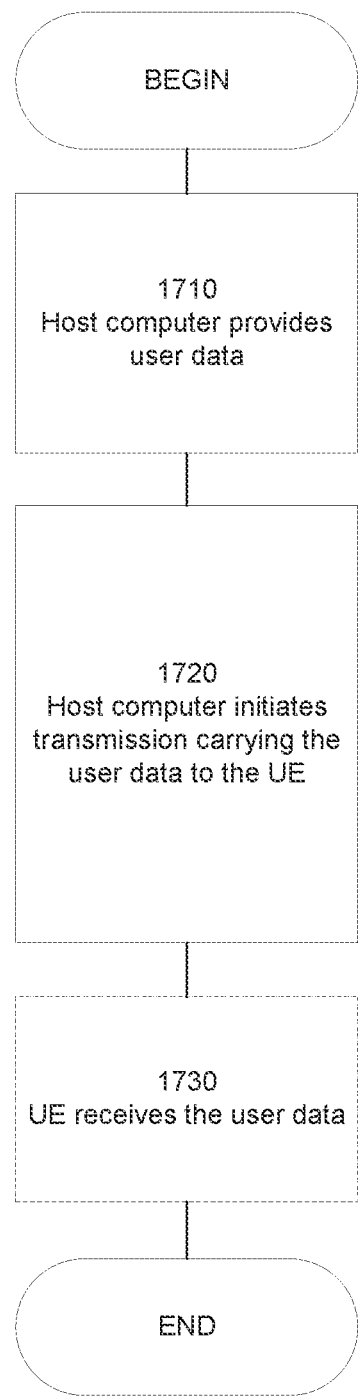
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
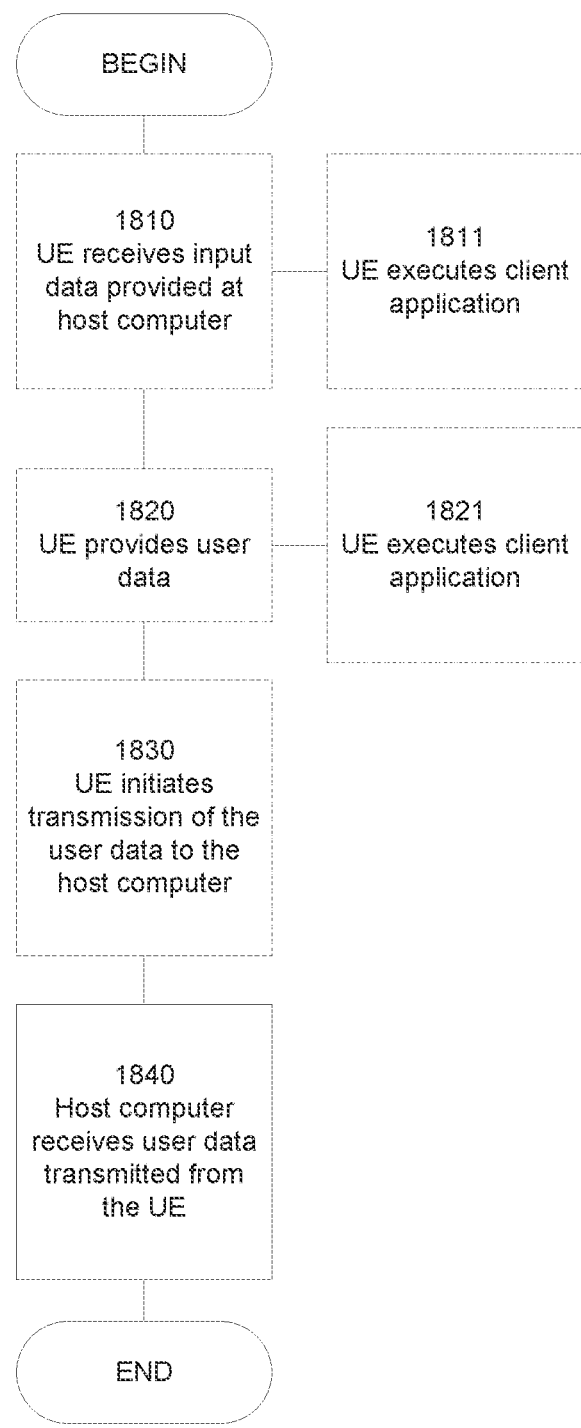
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
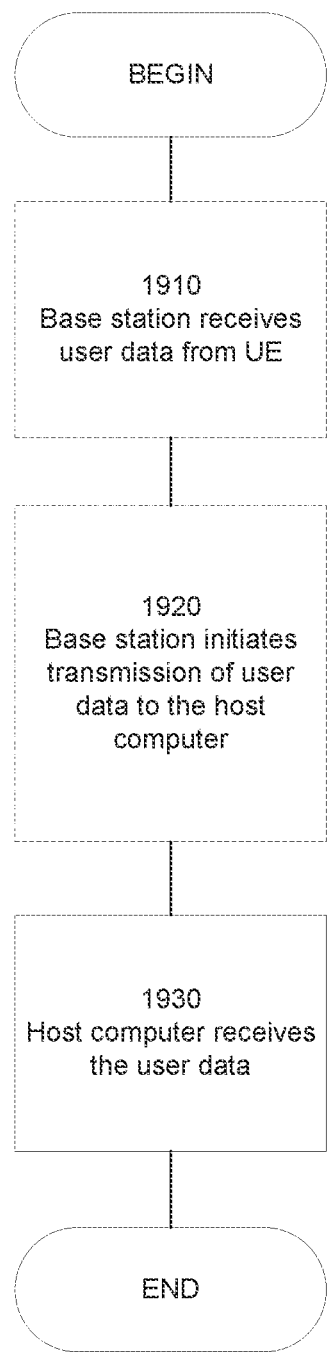
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method implemented by a user equipment (UE), the method comprising:
   obtaining a first initialization value, wherein the first initialization value is calculated based on:
   one of a first and a second parameter;
   a scrambling code ID; and
   a first Code Division Multiplexing (CDM) group; and
   obtaining a second initialization value, wherein the second initialization value is calculated based on:
   the other of the first and second parameters;
   an inverse of the scrambling code ID; and
   a second CDM group.

2. The method according to claim 1, further comprising receiving, from a network node in a wireless communication network, the first parameter, the second parameter, and the scrambling code ID.

3. The method according to claim 2, wherein the first and second parameters are received in a Radio Resource Control (RRC) message from the network node, and wherein the scrambling code ID is received in Downlink Control Information (DCI) from the network node.

4. The method according to claim 1, wherein obtaining the first initialization value comprises calculating the first initialization value based on the one of the first and the second parameters and the scrambling code ID.

5. The method according to claim 1, wherein obtaining the second initialization value comprises calculating the second initialization value based on the other of the first and second parameters and the inverse of the scrambling code ID.

6. The method according to claim 1, wherein the first and second parameters are selected by the UE based on the scrambling code ID.

7. The method according to claim 1, further comprising generating first and second data demodulation sequences based on the first and second initialization values.

8. The method according to claim 7, wherein the first and second data demodulation sequences comprise DM-RS sequences.

9. The method according to claim 1, wherein the first and second initialization values are first and second $c_{init}$ values.

10. The method according to claim 1, wherein the first and second initialization values are mapped to corresponding ports in the first and second CDM groups.

11. The method according to claim 1, wherein the first CDM group is different than the second CDM group.

12. The method according to claim 1, wherein the scrambling code ID corresponds to $n_{SCID}$, and wherein the inverse of the scrambling code ID corresponds to $1-n_{SCID}$.

13. A user equipment (UE) in a wireless communication network, the UE comprising:
   a communications interface circuit configured to communicate with a serving cell in the wireless communication network; and
   a processing circuit configured to:
   obtain a first initialization value, wherein the first initialization value is calculated based on:
   one of a first and a second parameter;
   a scrambling code ID; and
   a first Code Division Multiplexing (CDM) group; and
   obtain a second initialization value, wherein the second initialization value is calculated based on:
   the other of the first and second parameters;
   an inverse of the scrambling code ID; and
   a second CDM group.

14. The user equipment according to claim 13 wherein the processing circuit is further configured to receive the first parameter, the second parameter, and the scrambling code ID from a network node in the wireless communication network.

15. The user equipment according to claim 14 wherein the first and second parameters are received in a Radio Resource Control (RRC) message from the network node, and wherein the scrambling code ID is received in Downlink Control Information (DCI) from the network node.

16. A non-transitory computer-readable storage medium comprising a computer program stored thereon, wherein the computer program comprises executable instructions that, when executed by a processing circuit in a user equipment in a wireless communication network, causes the user equipment to:
   obtain a first initialization value, wherein the first initialization value is calculated based on:
   one of a first and a second parameter;
   a scrambling code ID; and
   a first Code Division Multiplexing (CDM) group; and
   obtain a second initialization value, wherein the second initialization value is calculated based on:
   the other of the first and second parameters;
   an inverse of the scrambling code ID; and
   a second CDM group.

* * * * *